Dec. 30, 1958 W. J. RACE 2,866,898

TUNER

Filed March 29, 1956 2 Sheets-Sheet 1

INVENTOR.

William J. Race

BY Mueller & Aichele

Attys.

Dec. 30, 1958 W. J. RACE 2,866,898

TUNER

Filed March 29, 1956 2 Sheets-Sheet 2

INVENTOR.
William J. Race
BY
Mueller & Aichele
Att'ys

United States Patent Office 2,866,898

Patented Dec. 30, 1958

2,866,898

TUNER

William J. Race, Franklin Park, Ill., assignor to Motorola, Inc., Chicago, Ill., a corporation of Illinois Application March 29, 1956, Serial No. 574,916

4 Claims. (Cl. 250—40)

This invention relates to signal seeking tuners for radio receivers and more particularly to such tuners wherein the direction of seeking may be reversed at any point of travel.

Automatic signal seeking or searching tuners are particularly advantageous for automobile radio receivers since the attention of the automobile driver should not be diverted to manually tune the radio when he is driving the car. One answer to this problem has been the use of pushbuttons with pre-set tuning. However, the number of pushbuttons is limited to approximately five, or six, which limits the number of stations. Furthermore, in some cases it is difficult to tune the pushbuttons and when driving away from the immediate home area the pushbuttons would have to be reset to the radio stations in the area of travel.

There have been prior motor driven tuning signal seeking radio receivers. However, prior signal seeking devices have been relatively complicated and expensive and have not provided all the facilities which are desired. For example, tuning in one direction only has generally been provided making it necessary to tune through the entire band to go from one station to an adjacent station which just precedes the first station in the tuning sequence. This is a considerable disadvantage and should be avoided in cases where the operator has a rough idea of where a desired station is on the frequency band.

Accordingly, an object of the invention is to provide a new and improved signal seeking tuner for a radio receiver.

Another object of the invention is to provide a new and improved control for a signal seeking tuner wherein the direction of seeking may be reversed at any frequency point.

Another object of the invention is to provide a new and improved mechanical control for a signal seeking tuner wherein the direction of seeking may be manually reversed at any frequency point, and is automatically reversed at the ends of the frequency band.

A feature of the invention is the provision of a signal seeking tuner having a single switch for controlling the direction of movement of the tuning elements in which a traveling member couples the tuning elements to the switch to operate the same at the ends of the frequency band, and manually operated controls are coupled to the switch for operating the same at the will of the operator.

Another feature of the invention is the provision of a signal seeking tuner having a reciprocating carriage which moves the tuning elements, with a member movable by the carriage at the ends of its travel operating a switch to reverse the carriage driving motor, and a pair of pushbuttons providing movement of a pivoted arm which is connected to the member to operate the member and thereby operate the switch to reverse the carriage driving motor through operation of the pushbuttons.

These and other objects and features of the invention will be apparent from a consideration of the following specification when taken with the accompanying drawings in which:

Fig. 4 is a schematic circuit diagram of the embodiment of Figs. 1, 2 and 3.

In the present invention, two pushbuttons are provided, one for energizing the signal seeking tuner in each of the opposite directions. The direction of seeking can be reversed at any time by pushing the proper button and is automatically reversed at each end of the frequency band. This is provided by a snap action switch controlled by a mechanical link coupled to the tuner carriage and operated thereby as the carriage reaches the end of its travel. The two pushbuttons are also coupled to the links to operate it regardless of the position of the carriage so that the switch is operated to reverse the direction of seeking or tuning.

Figures 1, 2:
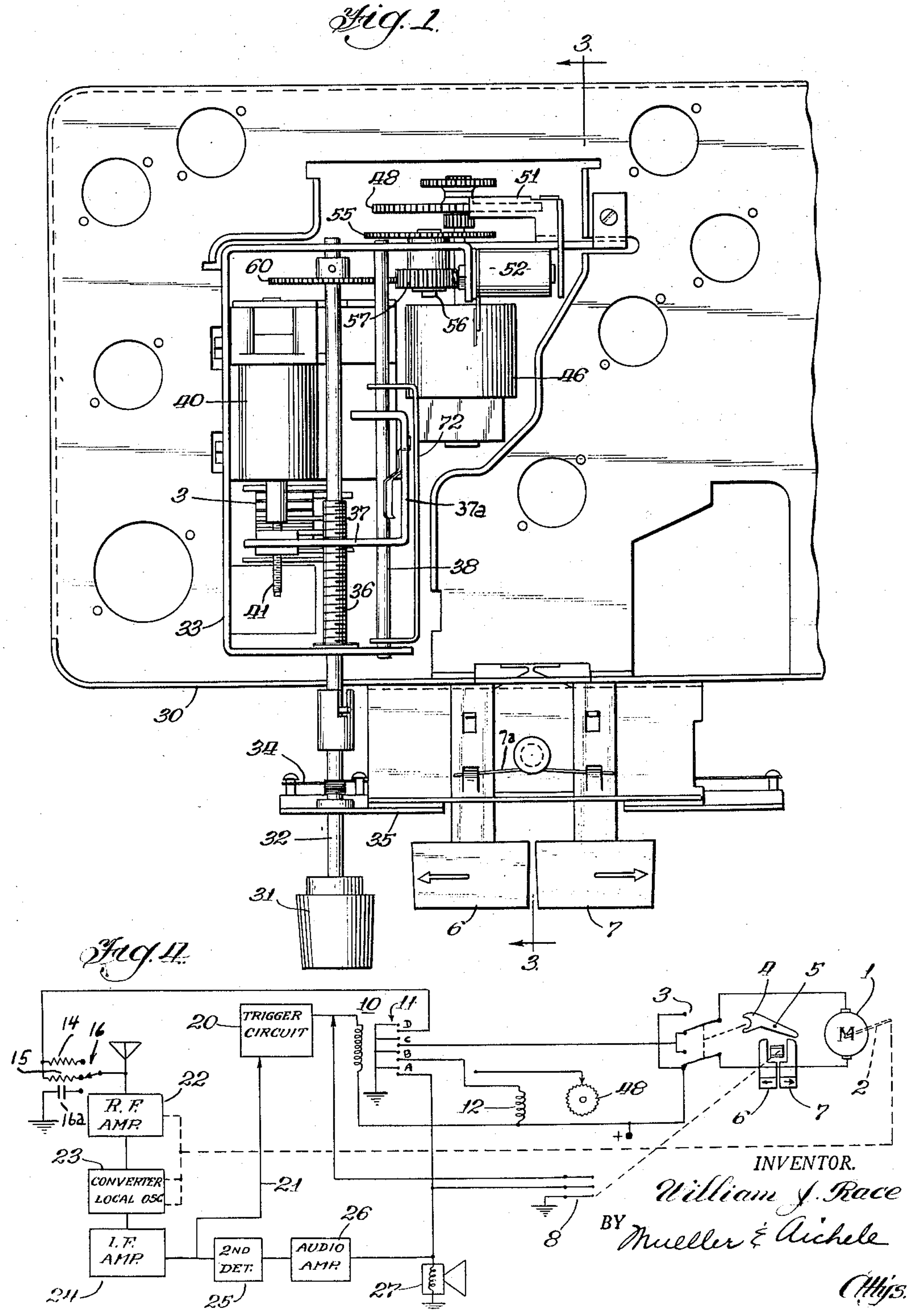
Fig. 1 is a plan view of an embodiment of the invention.
Fig. 2 is a plan view of the bottom of the embodiment of Fig. 1.
Figure 3:
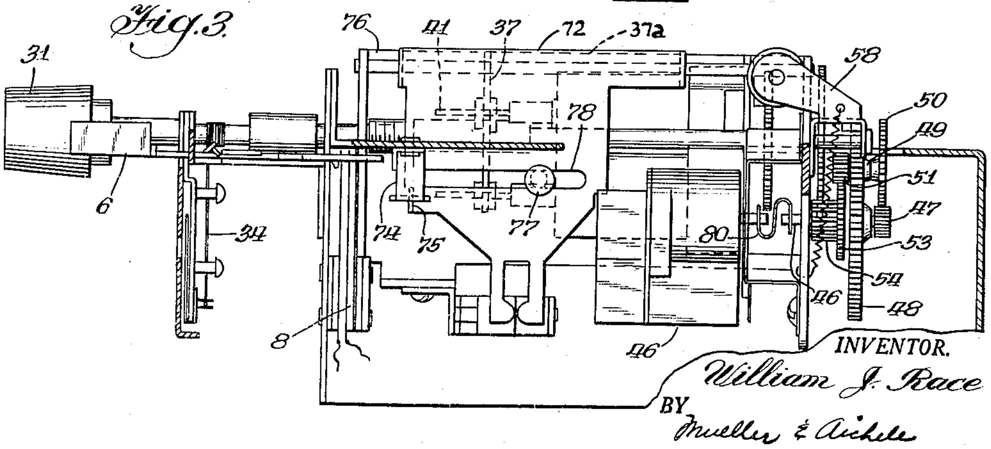
Fig. 3 is a sectional view taken along the line 3—3 of Fig. 1.

The operation of the embodiment of Figs. 1, 2 and 3 can best be understood by first considering the circuit of Fig. 4. The circuit comprises the motor 1, the output shaft 2 of which is connected to rotatably drive the tuning elements of the radio receiver. The motor is energized through the double-pole, double-throw switch 3, which is adapted to be actuated in either direction by the mechanism comprising the pivotally mounted lever 4, which is rotated about the point 5 by one or the other of the pushbuttons 6 and 7, which are biassed by spring *7a*.

When either of the pushbuttons are pushed in, the momentary, or normally open, switch 8 is actuated, which grounds out the speaker and actuates a relay 10. The relay 10 actuates a four-pole double-throw switch 11. Contact A of switch 11 keeps the speaker muted during the tuning operation. Contact B of the relay energizes relay 12, which locks a planetary gear 48 in the motor output drive system, which will be explained later. Contact C of the switch 11 energizes the motor 1 in a direction determined by the switch 3, and contact D of the switch 11 operates to cut the gain of the receiver by shunting a portion of the antenna input signal through resistors 14 or 15 (which are of different value) depending on the setting of switch 16. Searching at full sensitivity is obtained when switch 16 connects capacitor **16*a* to ground. The different settings of switch 16** provide a choice of the level of stopping signals for the seeking apparatus.

When switch 8 is closed by pushing either of the buttons, the relay 10 is energized as previously described, and the trigger circuit 20 is turned on because the motor is driven when switch 8 is closed and this generally moves the tuner off a signal. The relay is kept closed by the conductive current through the trigger circuit 20 when no signal is tuned, but the motor operates regardless until switch 8 is open. The trigger circuit may be a conventional positive acting switching or control circuit. Therefore, when the button is released, the relay 10 will continue to be energized by the current passing through the coil of relay 10 from the switching or trigger circuit 20. When a radio signal is received as the tuning elements are being rotated, a signal will appear on the lead 21, which may be connected to the intermediate frequency amplifiers. This signal is fed to the trigger circuit 20, and cuts off the output of the trigger circuit, thereby releasing the relay 10 and operating the switch 11. When the relays 10 and 12 open, the motor circuit is opened, and the tuning elements of radio frequency amplifiers 22 and the converter, local oscillator stage 23 stop. There will be no overrunning of the signal since locking member 58 releases to allow the planetary gears to turn and the motor to coast without further movement of the tuning elements. Gain is also restored to the receiver when relay 10 is de-energized. If the operator does not care for this station, he merely pushes one or the other of the pushbuttons and the tuning system operates again to seek a new station. All the radio stages are conventional and comprise radio frequency amplifier 22, converter and local oscillator 23, intermediate frequency amplifier 24, second detector 25, audio amplifier 26, and speaker 27.

Referring now to the mechanical arrangement, Fig. 1 shows a top plan view of an embodiment of the invention. The pushbuttons 6 and 7 are slidably mounted in the front center of the chassis 30. A manual tuning knob 31 is mounted on a shaft 32, which is rotatably mounted in the frame member 33. A conventional string connection is wound on the shaft 32 and adapted to move the indicator of the dial 35. The shaft 32 has a worm gear 36, which is adapted to drive the traveling frame 37, which is guided by the guide bar 38. One tuning coil 40 is shown in this view, and its core shaft 41 is adjustably connected to the traveling frame 37. Therefore, when the manual tuning knob 31 is turned, the worm gear 36 will drive the traveling frame 37, thereby moving the rod 41 of the tuning coil 40 in or out, thereby tuning the coil. There are two other tuning coils 86 and 87 (Fig. 2) and their cores are also connected to the frame 37.

Referring particularly to Fig. 3, the motor drive system includes the motor 46, the output shaft of which drives the shaft 32 through a gear drive system having a rather high gear ratio. The motor shaft is connected to and drives the small gear 47. The large gear 48 is freely rotatably mounted on the axis of the motor shaft. A shaft 49 is rotatably mounted on the gear 48, offset from the axis thereof, and the gear 50 on shaft 49 is driven by the motor output gear 47. On the other end of the shaft 49 is a small gear 51. The gears 47, 48, and 50 comprise a planetary system so that when the shaft 32 is turned manually, the gear 48 will rotate freely and the gear 50 will revolve and rotate in planetary manner around the motor output gear 47. For motor drive, the large gear 48 is locked by the locking member 58, which is actuated by the locking relay 52, which is previously described as actuated by the contact B of the switch 11, Fig. 4. No power can be transmitted by the motor unless the gear 48 is locked by the locking member 58. When tuning manually, the planetary gears effectively disconnect the motor.

In the locked condition of gear 48, power will be applied from the motor shaft through the gears 47, 50, 51, 53 and 54, which are fixedly connected together, to gear 55, which is mounted on the shaft 56 (Fig. 1). On the other end of the shaft 56 is mounted a gear 57, which contacts the gear 60 mounted on the tuning shaft 32.

Fig. 3 shows the output shaft of the motor 46, which has an "S"-type connection, preferably a Phosphor-bronze strip spring 80. This "S" connection connects the output shaft of the motor to the input shaft of the gear train. The arm 58 is the relay operated arm which locks the planetary gear 48.

The motor control system is best described in connection with Figs. 2, 3 and 5, Fig. 2 being a bottom view. The pushbuttons 6 and 7 are slidably supported on the mounting plate 61, and they are adapted to rotate a lever 4 about the point 5. The switch 8 is located on the center line between the pushbutton arms, with the pushbuttons having switch engaging portions or lips 6' and 7', Fig. 2 which are adapted to close the contacts of the switch 8 when either button is pushed. The operation of switch 8 has been explained in connection with Fig. 4.

The double-pole, double-throw reversing switch 3 is mounted underneath the tuning shaft 32, and has two pairs of fixed contacts 63, 64, and 65, 66. A pair of movable contacts 67 and 68 are mounted on two spring members 67' and 68', which are mounted at their center portions on switch members 62 and 62'. Each spring member has a coiled spring connected from one end to the other to provide a snap action positive contact. The outer ends of the spring members are connected together by insulating member 70, which is mounted on a long spring member 71. The spring tongue 71 extends to a slot in the slidably mounted switch actuator 72, which has an extension 73 loosely fitting in the jaws 74 of the lever 4.

Therefore, when one pushbutton is pushed, the lever 4 is rotated in one direction, thereby throwing the switch 3 in one direction. Therefore, the tuning will be initiated as described in connection with Fig. 4. The switch circuit will be discussed in connection with Fig. 5.

The automatic reversing is best described in connection with Fig. 3, which is a sectional view taken along the line 3—3 of Fig. 1. Referring to Fig. 3 and also to Fig. 2, the jaws 74 of the lever 4 actuate the extension 73 on the traveling member 72, which is guided by the guide rail 76. This is for manual reversal. The button 77 is mounted on the traveling frame 37, which moves the tuning coil rods, and this button 77 extends through the slot 78 in the switch actuator 72 as mounting for member 72. Assume the coil rods and button 77 are being driven to the right in Fig. 3. When the U-shaped portion **37*a* of traveling frame 37 engages the bent end of switch actuator 72, this member will move and operate switch 3. Reversal action also occurs when portion 37*a* and member 72 engage at the other end with frame 37** moving to the left.

Figures 2, 5:
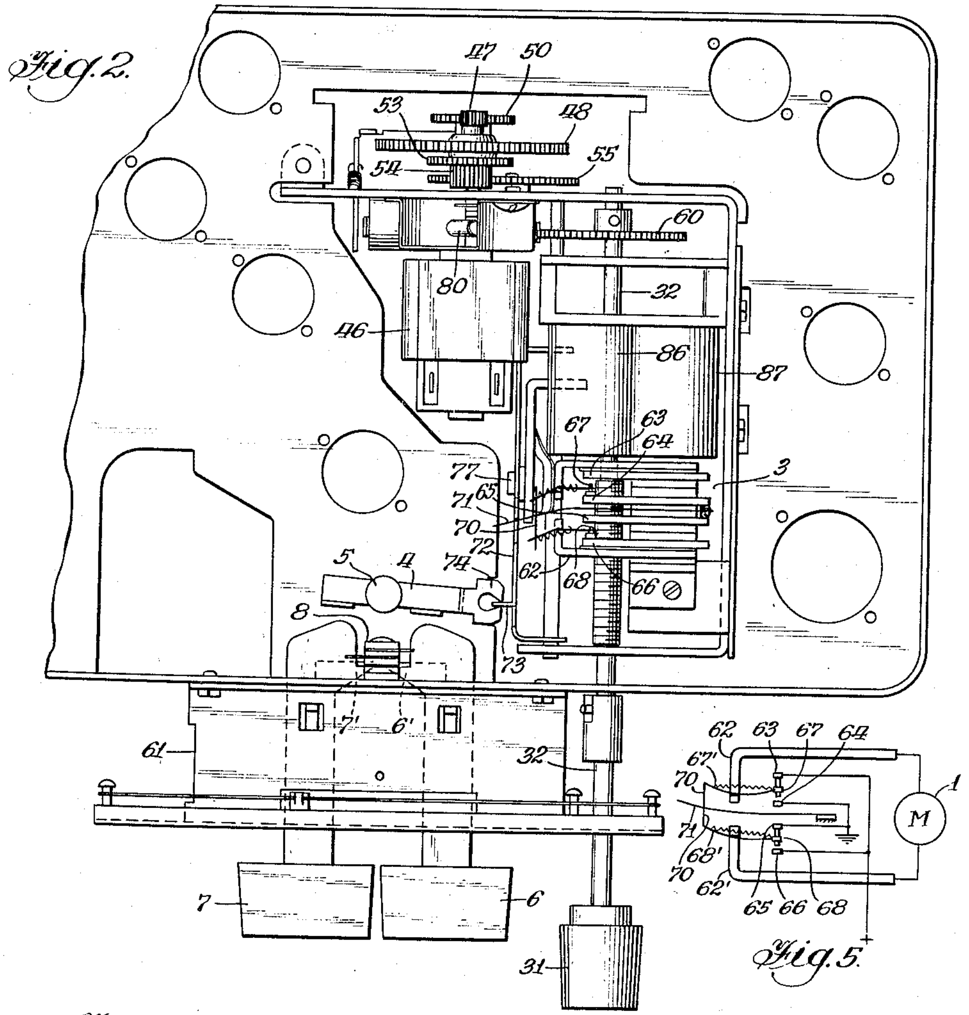
Fig. 5 is a schematic diagram of the motor switch.

Fig. 5 is a detail schematic diagram illustrating the circuit controlled by the reversing switch 3. The spring members 67' and 68' are connected to the switch members 62 and 62', which are connected across the motor 1. The two center fixed contacts 64 and 65 are connected to ground, and the two outer contacts 63 and 66 are connected to a source 85 of positive voltage. Therefore, when the spring members contact the upper fixed contacts, the motor is energized with one polarity and rotated in one direction, and when they contact the lower fixed contacts, the motor is energized in the opposite polarity operated in the opposite direction.

It is thereby seen that an improved control for a signal seeking tuner is provided whereby the direction of tuning may be easily controlled by the operator. The pushbuttons controlling the direction of tuning operate through a simple mechanical linkage to control the mechanism for reversing the direction of movement of the tuning elements when the ends of the range are reached. Accordingly, the direction of movement is in all cases controlled by a single switch to thereby simplify the circuit and the entire tuning mechanism.

I claim:

1. Apparatus for tuning wave signals including in combination, adjustable tuning means having variable means movable between positions of maximum travel for scanning a tuning range, an electric motor for driving said tuning means, a slidably mounted switch actuator movable to first and second positions by movement of said variable means respectively to said positions of maximum travel, reversing switch means operable by movement of said switch actuator for applying power to said motor from a power source, circuit means including first switch means operable to start said motor, said circuit means further including means to de-energize said motor when a signal is selected by said tuning means, a pivotally mounted arm engaging said switch actuator, first and second spring biased plunger rods individually engageable with said arm to move said switch actuator to said first position when one rod is operated and to said second position when the other rod is operated to control said reversible switch means for selecting the direction of scanning the tuning range of said tuning means.

2. Apparatus for tuning wave signals including in combination, adjustable tuning means having variable means movable between positions of maximum travel for scanning a tuning range, a reversible electric motor for driving said variable means, a slidably mounted switch actuator movable to first and second positions by movement of said variable means respectively to said positions of maximum travel, a double-pole double-throw reversing switch operable by movement of said switch actuator for applying current of different polarities to said motor, circuit means including first switch means coupled to said reversing switch and operable to start said motor, said circuit means further including means to de-energize said motor when a signal is selected by said tuning means, a pivotally mounted arm having an end portion engageable with said switch actuator to operate the same upon pivotal movement of said arm, first and second spring biased plunger rods having respectively spaced end portions positioned on opposite sides of the pivot point of said pivotally mounted arm, said plunger rods being individually engageable with said arm to move said switch actuator to said first position when one rod is operated and to said second position when the other rod is operated, said plunger rods further including adjacently positioned switch engaging portions, and said first switch means being supported in alignment therewith to be operated by individual movement of a plunger rod to energize said motor for scanning the tuning range in a selected direction.

3. Apparatus for tuning radio signals including in combination, adjustable tuning means having a carriage movable between positions of maximum travel for scanning a tuning range, a reversible electric motor for driving said carriage, a slidably mounted switch actuator aligned with said carriage and movable to first and second positions by movement of said carriage to said positions of maximum travel, a reversing switch operable by movement of said switch actuator for applying current of different polarities to said motor, signal seeking circuit means including normally open switch means coupled to said reversing switch and operable to energize said motor, said circuit means further including means to hold said motor energized and to deenergize the same when a signal is selected by said tuning means, a pivotally mounted arm having an end portion engaged with said switch actuator to operate the same upon pivotal movement of said arm, first and second spring biased plunger rods having respectively spaced end portions individually engageable with said arm to move said switch actuator to said first position when one rod is operated and to said second position when the other rod is operated, said plunger rods further including adjacently positioned switch engaging portions, and said first switch means being supported in alignment therewith to be operated by individual movement of one plunger rod to energize said motor when said one plunger rod is held operated for scanning the tuning range in a selected direction so that release of said one plunger rod permits automatic signal selection by said signal seeking circuit means.

4. Apparatus for tuning wave signals including in combination, adjustable tuning means having carriage means movable between positions of maximum travel for scanning a tuning range, an electric motor for driving said tuning means, reversing switch means having a slideable actuator, said actuator being operable by said carriage means in the positions of maximum travel thereof, said actuator moving between first and second positions for reversing said motor, circuit means connecting said reversing switch means to said motor, said circuit means including contact means operable to initially energize said motor and means to deenergize said motor when a signal is selected by said tuning means, and manually operable control means having first and second operative portions, said control means including means for operating said contact means by either one of said first and second portions thereof, said reversing switch means further being operable when said carriage means is at positions intermediate said positions of maximum travel for reversing said motor, said control means further including a mechanical linkage engageable with said slideable actuator of said reversing switch and means for operating the same to said first position by action of said first portion and for operating said actuator to said second position by action of said second portion, whereby the direction of scanning the tuning range is determined by selective operation of said portions of said control means and said tuning means is automatically reversed upon reaching a position of maximum travel.

References Cited in the file of this patent

UNITED STATES PATENTS

| | | |
|---|---|---|
| 2,369,542 | Dietrich | Feb. 13, 1945 |
| 2,487,760 | Koch | Nov. 8, 1949 |
| 2,529,677 | Case | Nov. 14, 1950 |
| 2,531,033 | Doutt | Nov. 21, 1950 |